United States Patent
Slifkin et al.

(10) Patent No.: US 8,390,464 B1
(45) Date of Patent: Mar. 5, 2013

(54) INTEGRATING REFRIGERATED TRANSPORT OPERATIONS AND LOGISTICS BY CREATING OPERATIONAL STATES VIA WIRELESS COMMUNICATIONS

(75) Inventors: Timothy Slifkin, Morristown, NJ (US); Thomas A. Robinson, Mendham, NJ (US); Venkateswaran Karuppanan, Morristown, NJ (US)

(73) Assignee: Startrak Information Technologies, LLC, Morris Plains, NJ (US)

( * ) Notice: Subject to any disclaimer, the term of this patent is extended or adjusted under 35 U.S.C. 154(b) by 979 days.

(21) Appl. No.: 12/251,445

(22) Filed: Oct. 14, 2008

Related U.S. Application Data

(60) Provisional application No. 60/979,385, filed on Oct. 11, 2007, provisional application No. 60/979,391, filed on Oct. 12, 2007, provisional application No. 60/979,743, filed on Oct. 12, 2007.

(51) Int. Cl.
*G08B 17/00* (2006.01)

(52) U.S. Cl. ......................................... 340/585
(58) Field of Classification Search ................. 709/224; 340/585
See application file for complete search history.

(56) References Cited

U.S. PATENT DOCUMENTS

| | | | | |
|---|---|---|---|---|
| 5,424,720 A | * | 6/1995 | Kirkpatrick | 340/585 |
| 7,027,808 B2 | * | 4/2006 | Wesby | 455/419 |
| 2002/0198990 A1 | * | 12/2002 | Bradfield et al. | 709/224 |
| 2007/0214258 A1 | * | 9/2007 | Karrapanan et al. | 709/224 |
| 2011/0090041 A1 | * | 4/2011 | Naden et al. | 340/3.1 |

* cited by examiner

*Primary Examiner* — Robert L. Deberadinis
(74) *Attorney, Agent, or Firm* — Drinker Biddle & Reath LLP

(57) ABSTRACT

A system allows a remote asset, via an Intelligent Device and interconnected Central Data Server to autonomously, and continuously monitor and update its status on various parameters; and from these, to calculate an overall asset state that may be caused by various combinations of the parameters and to infer the operational states and logistical position of a transport refrigeration unit.

16 Claims, 8 Drawing Sheets

INTEGRATING REFRIGERATED TRANSPORT OPERATIONS AND LOGISTICS BY CREATING OPERATIONAL STATES VIA WIRELESS COMMUNICATIONS

RELATED APPLICATIONS

Applicants claim the benefit of U.S. Application Ser. No. 60/750,498 filed Dec. 15, 2005. This application is related to U.S. Application Ser. No. 60/750,498 filed Dec. 15, 2005. This application is also related to U.S. application Ser. No. 11/611,838 filed Dec. 15, 2006. This application also claims the benefit of U.S. Application Ser. No. 60/979,385 filed 11 Oct. 2007, and Ser. No. 60/979,391 filed 12 Oct. 2007, and Ser. No. 60/979,743 filed 12 Oct. 2007. The subject matter of all these applications is hereby incorporated herein as if fully recited herein.

FIELD OF THE INVENTION

This invention relates to determining and updating of state of assets at various locations, and to particularly inferring the operational states and logistical position of a transport refrigeration unit.

BACKGROUND OF THE INVENTION

Current practice involves a human operator who must determine overall asset state manually, or requires passing data to a central server and such overall asset state determination is made on the server itself by an operator. U.S. application Ser. No. 11/611,838 filed Dec. 15, 2006 discloses improvements in asset state determination and updating. However, problems in such areas remain.

An object of this invention is to overcome such problems.

SUMMARY OF EMBODIMENTS OF THE INVENTION

An embodiment of the invention involves inferring the operational states and logistical position of a transport refrigeration unit and integrating refrigerated transport operations and logistics by creating operational states via wireless communications.

These and other aspects of the invention are pointed out in the claims forming a part of this specification. Other objects and advantages of the invention will become evident from the following detailed description when read in light of the following drawings.

DETAILED DESCRIPTION OF PREFERRED EMBODIMENTS

Figure 1:
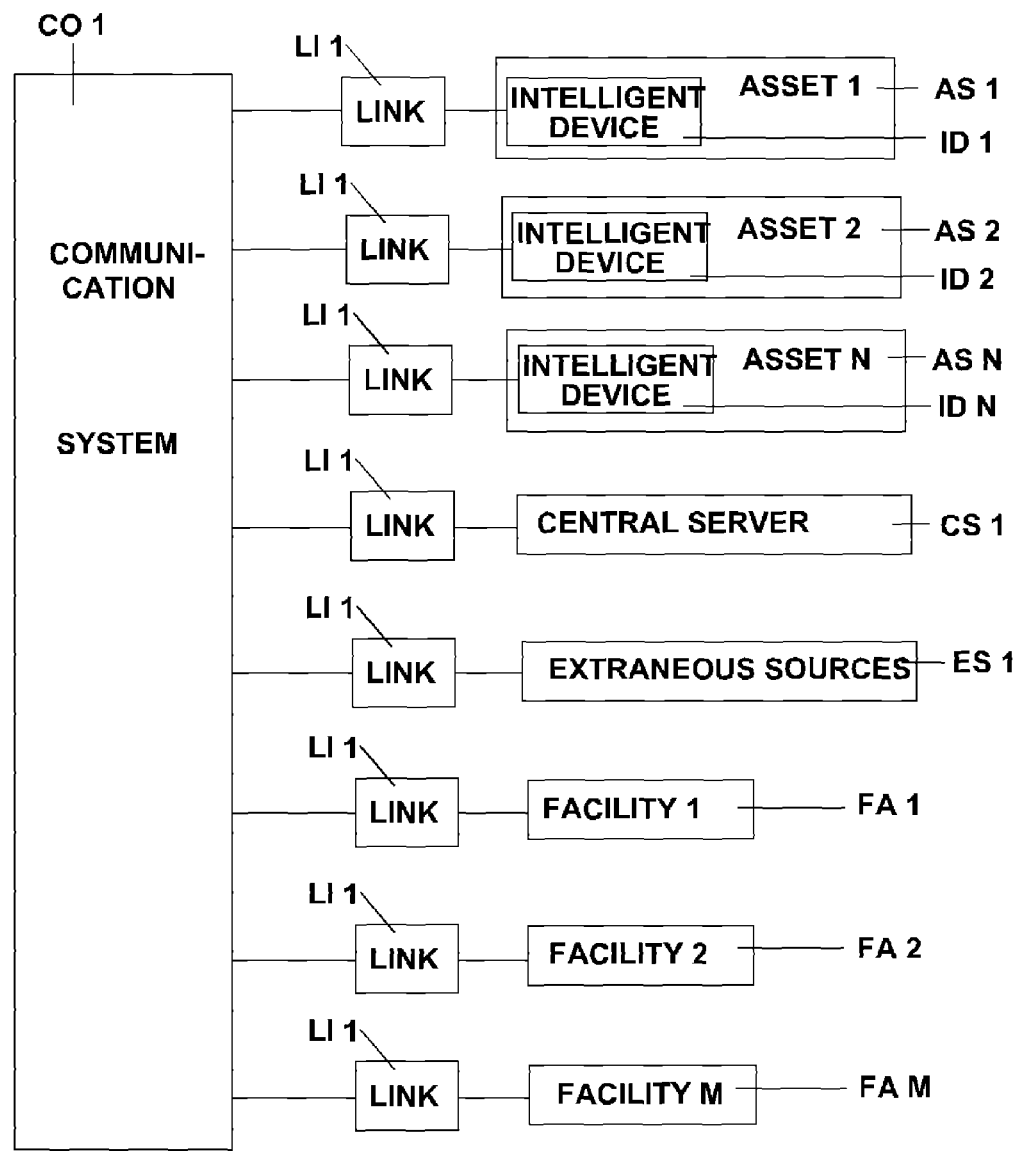
FIG. 1 is diagram of a system embodying aspects of the invention.

In the system of FIG. 1, a communication system CO1 establishes communication, via links LI1, between a central server CS1 and intelligent devices ID1, ID2, . . . IDN in N assets AS1, AS2, . . . ASN, and extraneous sources ES1, and M number of facilities FA1, FA2, . . . FAM. According to embodiments of the invention, the links LI1 and the communication system CS1 includes one or more of available arrangements, such as telephone land lines, wireless systems, satellite communications, Internet services, radio signals, etc. The assets AS1, AS2, . . . ASN include any one or more of stationary or moving devices, such as a train car, a bus, a truck, airplane, etc. For simplicity the reference characters ID1, ID2, . . . IDN are referred to collectively as IDx, the reference characters AS1, AS2, . . . ASN as ASx, and the reference characters FA1, FA2, . . . FAM as FAx.

Figure 2:
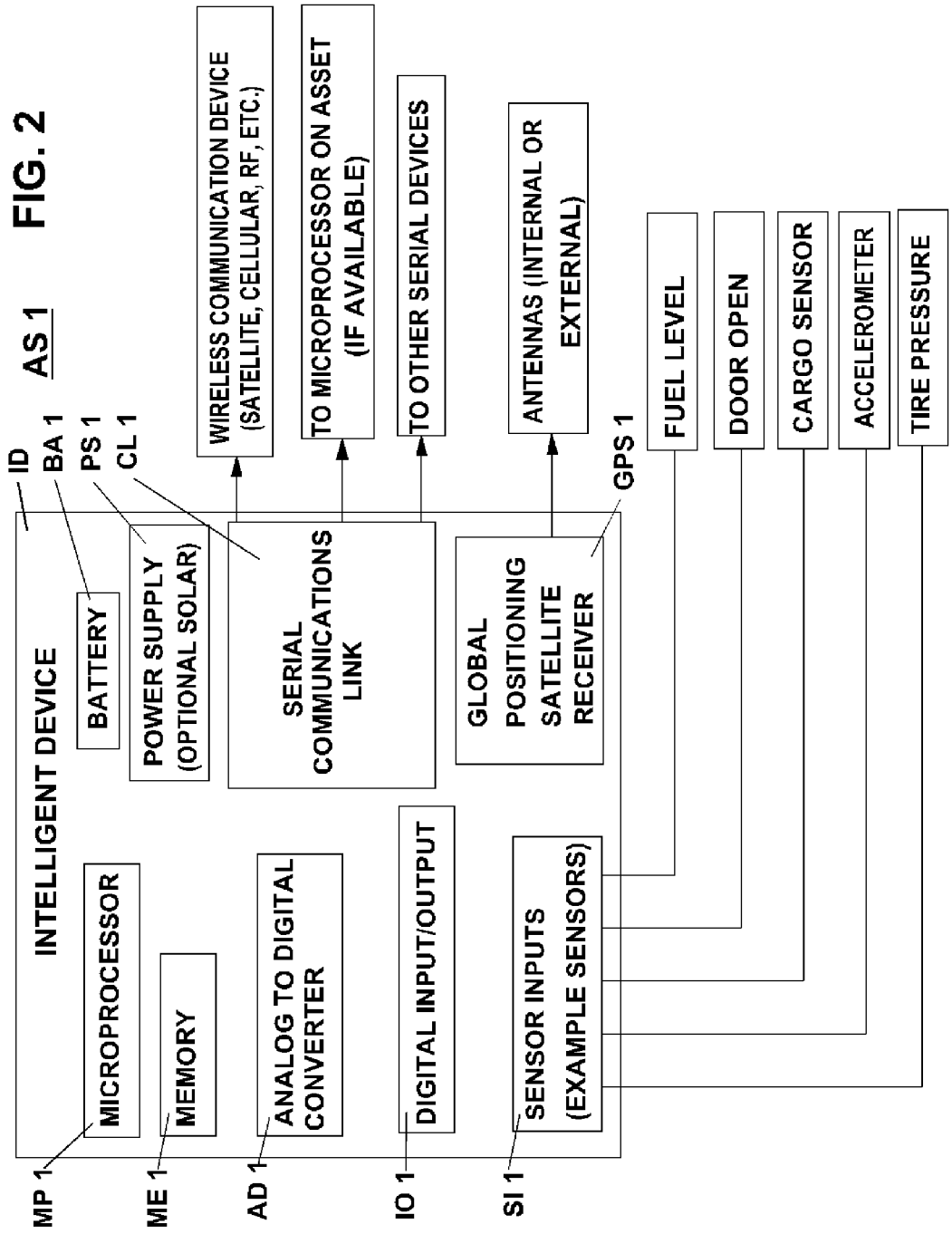
FIG. 2 is a block diagram illustrating details of one of the assets of FIG. 1 and embodying aspects of the invention.

Details of the intelligent devices IDx appear in FIG. 2. Each IDx includes an interconnected system of a battery BA1 and/or power supply PS1 (optional solar) that powers a microprocessor MP1, a memory ME1 coupled to the microprocessor, an analog to digital converter AD1, a digital input/output IO1, sensor inputs SI1 (for example sensors), a serial communications link CL1, and a global positioning satellite receiver GPS1. These elements are all interconnected as necessary.

The sensors in the sensor inputs SI1 receive data from the asset ASx carrying the device IDx. According to embodiments of the invention, the sensor inputs SI1 receive, from the asset ASx, data representing the asset fuel level, whether a door in the asset is open, the weight of any cargo, accelerometer outputs from movements of the vehicle, tire pressures, etc. These are only samples of the possible input and other inputs are considered as embodiments of the invention.

The serial communications link CL1 outputs signals to one or more of a link LI1 (designated "wireless communications device (satellite, cellular, RF, etc.)" in FIG. 2), another microprocessor on the asset AS1 (if available on the asset), other serial devices, and antennas (internal or external).

According to embodiments of this invention each remote asset ASx operates, via an Intelligent Devices IDx and interconnected Central Server or Central Data Server CSx ("data server"), 1) to autonomously, and continuously monitor and update its status on various parameters or conditions which pertain to the asset ASx; 2) from these, to calculate an overall asset state created by one or more of various combinations of the parameters; 3) to provide near-real-time updates to the central server CSx that is connected to various information distribution paths; and 4) to accept communication from the central data server CSx which may provide additional information to the asset allowing it to further modify its state. Further, the central server CSx itself serves 5) to provide additional parameter information from other sources (such as industry standard "Electronic Data Interchange messages"); 6) to instantly and autonomously modify its state table to denote all parameters effected by a change in any single parameter; 7) to download new state information to the asset via wireless or wired links LI1; 8) then to allow, via the communication system CO1 in the form of one or more of Internet or similar network connection, any authorized user to access the system and determine the state of any asset in the population, regardless of geographic location.

According to embodiments of the invention, the assets ASx may be located in any of similar or radically different locations, interconnected by multiple wired or wireless communication links (i.e. local RF in a yard or on a ship, satellite and/or cellular over wider distances) and may have an unlimited number of parameters and or conditions associated with their status. This then allows any authorized user immediately to ascertain (via communication with a web-enabled application over the Internet for example) the status of any asset ASx in the fleet, regardless of its geographic location.

Each asset AS1 includes an Intelligent Device IDx, which is connected via wireless (i.e. satellite, cellular, RF or other) or wired link to any of several reporting points. The data is collated and sent with the communication system CSx, via appropriate means (Internet, or other communications mechanism) to a central database in the central server CS1. From there, it is delivered to any number of users for viewing.

According to embodiments of the invention the wireless intelligent devices IDx and the associated equipment including the central server CS1 automatically cause freight assets ASx to assume a pre-defined "conventional freight state", based solely or substantially on its self-monitored condition (which may include data received over the communication system CS1, for example via a wireless LI1). This is in contrast to current practice wherein a human operator must determine overall all asset state manually, or where data is passed to a central server and such determination is made on the server itself by an operator.

For example, by virtue of its sensor inputs SI1, its GPS, and other inputs of the intelligent device IDx including communication from the communication system CO1, an asset ASx will "know", i.e. have data as to, its relative location, that it is out of fuel, that it requires a diagnostics check, that it is currently not connected to any other asset, and that it's tire pressure is low, or other measured condition. As a result of the asset's "knowing" the state of these various parameters, it also "knows"—and can signal to the central server CS1—a specific state that may be assessed via evaluation of all these parameters. i.e., it will "know" that it is "Not Available for Service". Once all of these parameters are brought into compliance (i.e. fuel loaded, pre-trip completed, and tire pressure adjusted), the asset will then "know" autonomously, that its state has changed to "Ready for Service" and it will send the appropriate message to the central server. All inventory values (Yard, Regional, units awaiting fueling, etc.) will thus be updated automatically. Note that this state change, based on continued autonomous updating of a variety of parameters, can be arrived at either by the Intelligent Device IDx on the asset ASx, or by the central server CS1 based on appropriate data.

The state transition from "Not Ready for Service" to "Ready for Service" is accomplished autonomously by the central server CS1 and/or the Intelligent Device IDx on the asset Asx, based on information gathered from local sensor inputs SI1 and via wireless links LI1 and the communication system CS1. No human intervention is required for the asset to change its state.

As an example, a refrigerated trailer entering a yard facility would use the GPS unit GPS1 (built into the device IDx) and compare it with "geofence" locations stored internally on the device IDx. It would then "know" that it had arrived at the facility FAx and send a notification over its wireless link LI1 to the central server CS1. According to embodiments of the invention this is performed without human intervention. The system, upon receiving the notification of entry to the yard from that trailer, would then instantly and autonomously update the status of that particular trailer so that appropriate personnel would know that it was now in the yard and ready to be unloaded.

According to embodiments of the invention, the asset ASx uses other detailed information, such as battery voltage, fuel on board, loaded/empty status, tire pressure, etc. to determine its current state. It sends data on its state, and the related parameters, instantly and continuously to the central server CS1 whenever an appropriate change occurs (as determined by the control device). This results in a "matrix" of information, which changes constantly based on information sent from each remote asset ASx by the control device, and without human intervention.

According to embodiments of the invention, autonomous processes maintain and update any combination of asset parameters. For example, all assets ASx requiring refueling at each facility can become instantly visible to pool personnel. Any assets ASx requiring maintenance can likewise become visible to appropriate maintenance personnel.

According to an embodiment of the invention data is viewed from several perspectives. If for example, an asset ASx leaves the yard in Newark enroute for a yard in Philadelphia, the yard Manager in Newark will immediately see his inventory decrease by one asset. The New York Region manager will also see his inventory decrease by one. Any related viewers (i.e. Maintenance Supervisor, etc.) will see the inventory of their relevant assets decrease by one within that yard and region. Then, when the asset gets to Philadelphia, the inventory in that yard will automatically increase by one. Thus, the assets ASx are directly driving the changes in all status elements across the entire population in real time and without human intervention.

According to embodiments of the invention, web-enabled, user-directed report filter based on multiple parameters, which allows quick overview of any assets ASx meeting criterion established by the user. For example, a "Ready Assets" filter would show only those assets for which all relevant parameters were in the appropriate state (i.e. fuel full, no maintenance, tire pressure OK, pre-trip successfully completed, etc.) This allows the user a method for quickly evaluating final status, which could be based on a large number of parameters. Due to the Web nature of the solution, this feature can be implemented by any authorized user in any geographic location, and may provide status on any asset in the population, regardless of physical location.

In this manner, a very large fleet of assets Asx (such as refrigerated trailers or containers) in multiple geographical locations, all provide updated information to the database server CS1 as it occurs autonomously and without human intervention. Thus, the dispatcher is viewing constantly updated data generated autonomously by the individual assets.

According to embodiments of the invention User-settable filters at the server CS1 provide classification into defined Conditions based on the status of a variety of parameters—each of which is determined by the asset via on-board intelligence and/or by the server itself autonomously.

According to embodiments of the invention, information is sent from an Asset ASx to a remote device, such as to the driver of the vehicle planning to move the asset via an appropriate wireless or wired device. The driver is then assured that the asset he is planning to move is, in fact, ready for movement.

The invention has a number of advantages, for example:
1. Assets ASx can autonomously determine (and modify) its current state by reading various parameters—either directly through sensors or through wireless or wired communications links. No human intervention is required.
2. Assets autonomously drive update of parameters in the central server system as appropriate (i.e. no polling is required).
3. The server CS1 itself can also autonomously update the state of any asset based on its reading of a variety of parameters, some of which will have come from the Intelligent Device on the asset, and some may have come from other sources (i.e. Industry 322 messages or specific operator inputs).
4. All relevant inventory records adjusted automatically and in real time at the server and, optionally, on the Intelligent Device IDx on the asset ASx as well.
5. The individual asset can change its state autonomously based on information from multiple sensors and sources.
6. Decisions regarding change of state can be done on the asset via its on-board Intelligence Device, and/or by the central server.
7. User-settable filters at the server allow classification into defined Conditions based on the status of a variety of parameters—each of which is determined by the asset via on-board intelligence and/or by the server itself autonomously.
8. Entire system is fully self-modifying without human intervention, and over various communications link such that no specific actions are required by personnel to capture current status of all parameters and, more importantly, overall State of the asset (i.e. Ready for Deployment).
9. All related states are changed as appropriate.
10. This information can be sent from the Asset to a remote device, such as to the driver of the vehicle planning to move the asset via an appropriate wireless or wired device. This allows the driver to be assured that the asset he is planning to move is, in fact, ready for movement.

Figure 3:
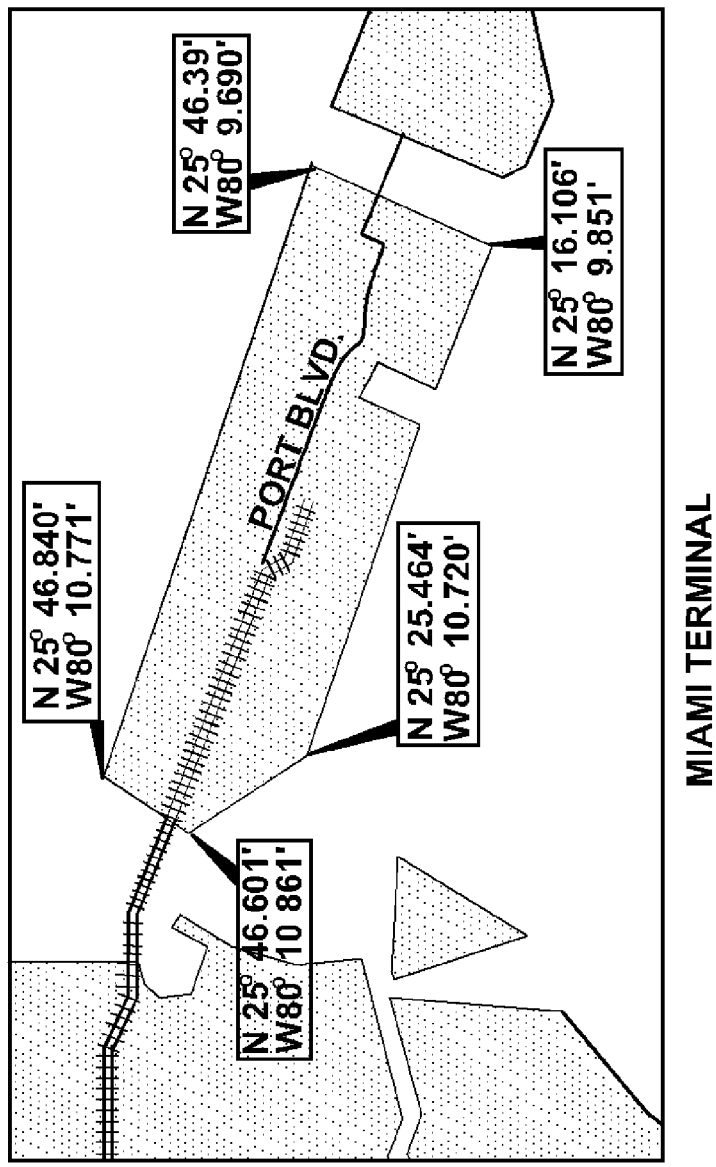
FIG. 3 is a diagram illustrating use of the system in FIG. 1, FIG. 2, and FIG. 3.

FIG. 3 illustrates a terminal such as the Miami terminal to illustrate endpoint of a region. Endpoints of a region, such as a facility FAx like a shipping yard, can be used to denote a geofence location. The system denotes "In" or "Out" based on the asset's location within the perimeter. This then becomes one of the states. Likewise, location within a smaller area within the yard (such as a fueling or loading dock) can also be calculated by the device IDx on asset ASx and used to autonomously update its state.

Figure 4:
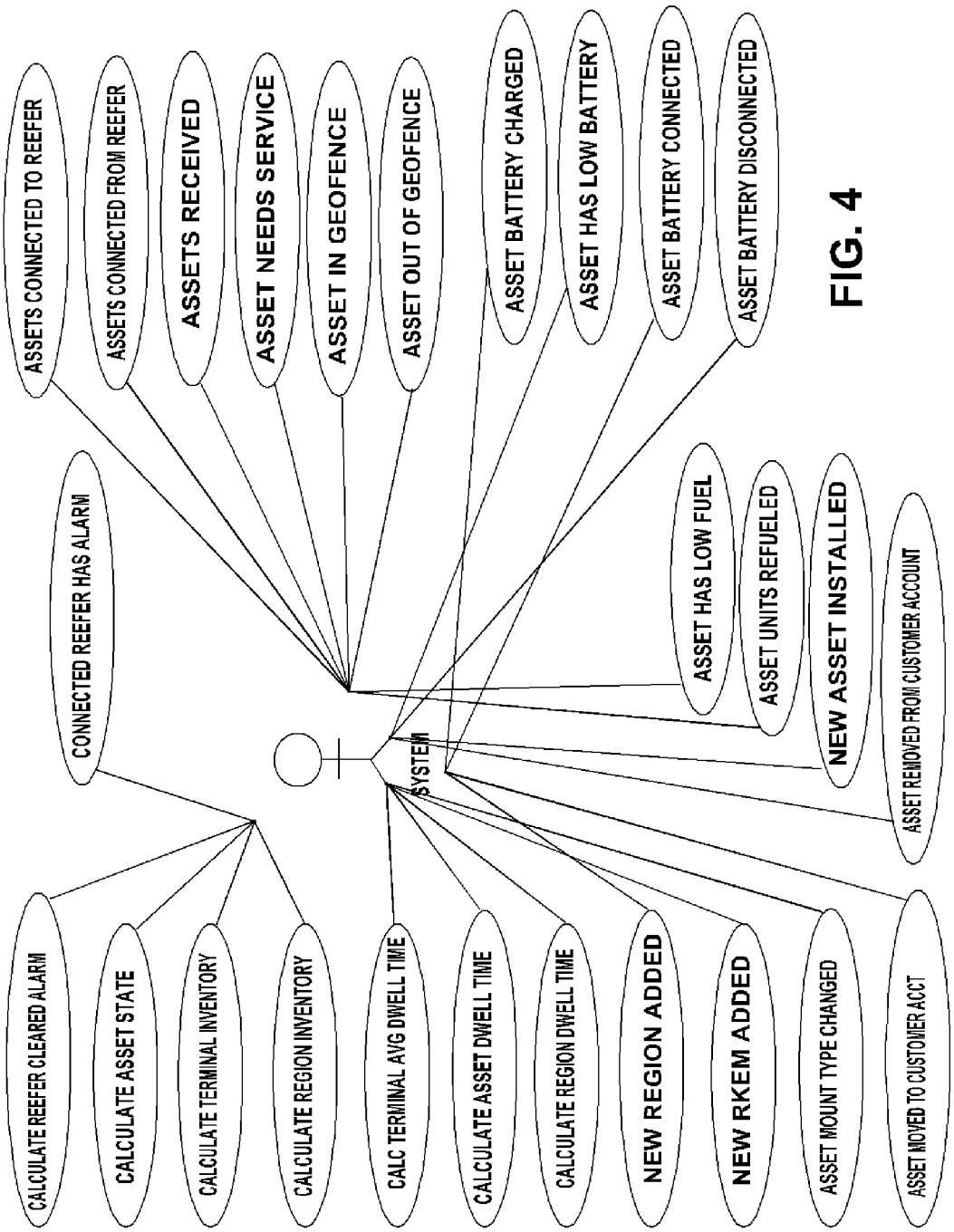
FIG. 4 is a diagram depicting steps performed by the system of FIG. 1, FIG. 2, and FIG. 3 and embodying aspects of the invention.

FIG. 4 illustrates an aspect of the operation involving some of the parameters. This illustrates of some of the parameters the Intelligent Device IDx, with which the server CSx can monitor and react with autonomously. The process is continuous and ad hoc. Any device can autonomously and instantly change its state from information received from its sensors, or via its wireless or wired links LI1. Thus, when fueling for that particular asset ASx is complete, it then instantly and autonomously updates its state, and then relays its new state information to the central server CS1. When a user completes a load operation, the central server CS1 can compare the other parameters of the asset to determine its final state (i.e. ready for shipment). There is no need for the central server CS1 to coordinate the process, nor to query each asset ASx periodically in order to maintain a current inventory and state table of all assets, regardless of geographic location. Effectively, the central server CS1 keeps accurate and current inventory and state table via autonomous communication from each of the assets in the entire population. Any view looking at any report will be immediately updated so that the report he is currently viewing is always current.

According to other embodiments of the invention, the Intelligent Device IDx has the means to make most determinations autonomously. In addition to its own sensors, it can also read the microprocessor attached to the asset ASx (if available) to capture information directly from the asset ASx as well. Further, the attached GPS unit allows the Intelligent Device IDx to know where it is geographically, and to determine any appropriate state conditions that are related to location. Internal processing of this data and sensor input allows the Intelligent Device IDx to make a determination as to state of the asset, and then send that updated State information directly to the central server via any one of several communications channels (wireless or wired) in the communication system CO1. The central server CS1 can then evaluate other data relevant to the asset ASx that has come into the system from other channels (i.e. load operation complete) and adjust the state table to reflect the correct state across a number of inventory parameters.

A gps wireless device xx mounted on the transport refrigeration unit, which is constantly monitoring and recording the refrigeration system and potentially a number of other sensors measuring the operational state of the system, records the operational status of the refrigeration unit and transmits the information to a data base. By collectively organizing the information in relation to the events expected in the freight delivery operations of a refrigerated transport unit, an application is able to create unique events, which serve as time boundaries of the operational state of the reefer. For instance, with the advent of a "transport refrigeration unit on" event, followed by a "change temperature set point" event, it is feasible to determine that a shipment cycle is soon to be initialized. By monitoring actual frequent temperature readings compared to the set point, it is feasible to determine when the transport refrigeration unit has been "pre-cooled" and a "Pre-cooling Satisfied Event" may be generated. At this point, in conjunction with the unit's gps position in relation to a freight loading facility, it is feasible to measure in real-time the any inefficiently in the freight cycle while the refrigeration transport unit is waiting to be loaded. During this time frame, the refrigeration transport unit would needlessly cost the operator in inefficient utilization, wasteful fuel consumption and needless carbon emissions. The automatic process of identifying this inefficient state and measuring it in real time can lead to significant operational, quality and environmental savings.

Furthermore, this invention includes the methodology to utilize the temperature set point, discharge (supply), return and other control temperature readings, such as remote temperature probes, to evaluate and create an automatic and autonomous "pre-cooling satisfied events" by wireless communications, so that this event can be time stamped and delivered to the transport refrigerated operators automatically. The pre-cooling satisfied event would then be used to measure the time frame that the refrigerated transport unit is idle or unloaded (i.e. a "pre-cooled but idle state"), including "pre-cooled but stationary" and "pre-cooled but moving" states, based on gps movement status, until the wireless device records another sensor driven event, which may be interpreted as a loading event, such as a door opened event or a temperature spike event (if door sensors are not available). The "pre-cooled but idle" state would then be measured and used systematically to improve the transport refrigerated efficiency of the operation.

Thus, by simultaneously and frequently recording (1) the operational status of the refrigerated unit equipment, including the on/off and temperature set point changes, (2) the gps location of the transport refrigeration unit and (3) the operational condition of the transport refrigeration unit, including its operational control temperatures, it is feasible to automatically a "reefer logistics state machine", which identifies events, which are meaningful real time operational events of the delivery life cycle. The event detection becomes more useful the more frequent monitoring measurements are made. In this manner, operational "states" are automatically measured and can therefore be systematically examined and improved. Combining the concept universally to a fleet of transport refrigeration units, it is feasible to create systematic measurements of fleet operations, leading to improvements. In this manner, not only is the overall operational logistical efficiency of the refrigerated freight operation improved, but also the quality of the produce is better and the environmental pollution is lessened.

Figure 5:
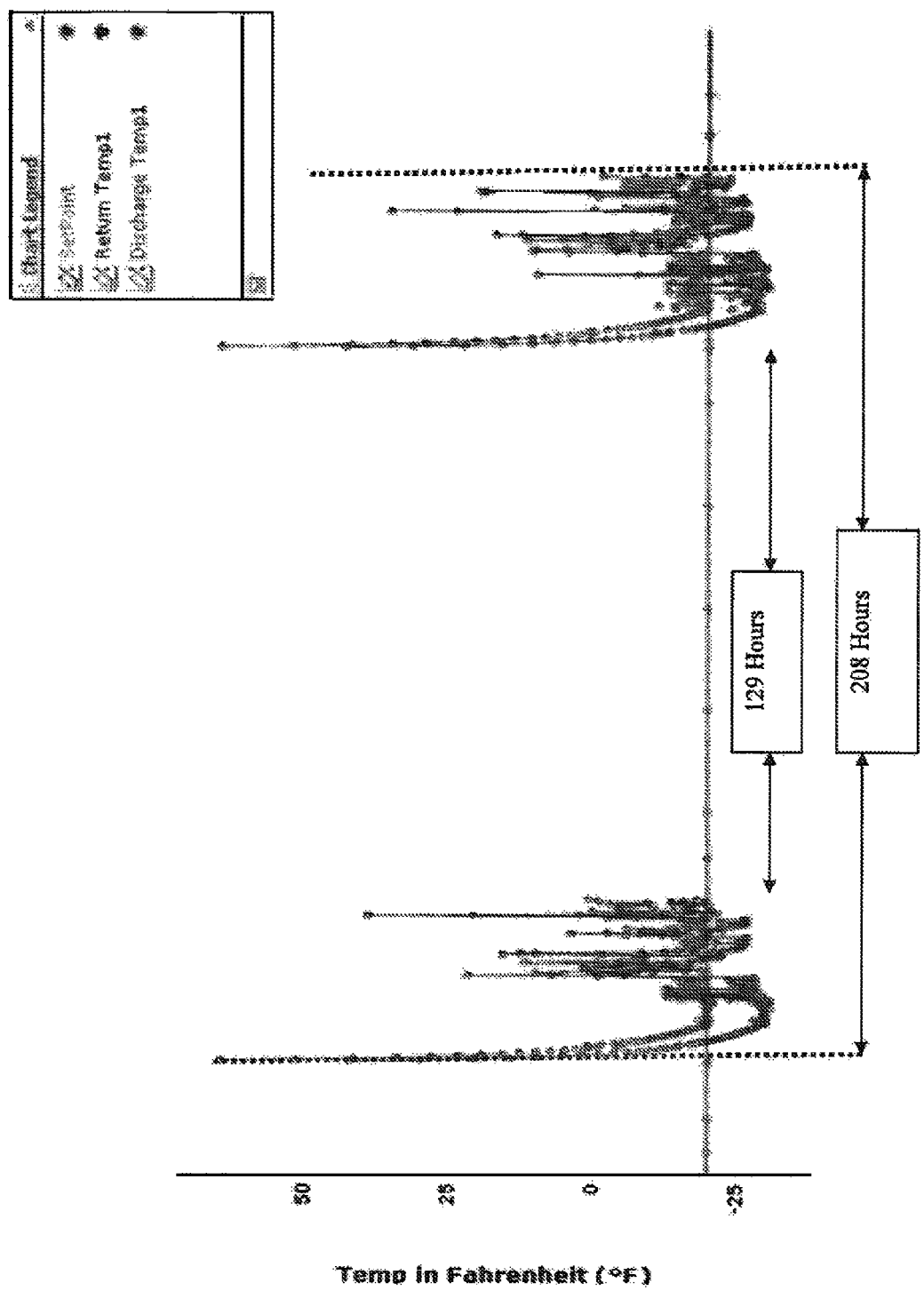
FIG. 5 shows the control temperatures of a transport refrigeration unit over approximately a two week period for a single trailer.

In part embodiments of the invention involve:
1. Transport Refrigeration ON Event/Set Point Change Event/Set Operating Characteristics
2. Pre-cooling Satisfied Event
   a. Pre-cooling Satisfied Event Automatic Notification
3. IN Loading or ORIGIN Geo Fence Event
4. Coordinated Loading Event (simultaneous temperature spike and door open event) IN an ORIGIN geo fence
5. OUT of a ORIGIN Geo Fence (when the system is loaded and pre-cooled to temperature)
6. Coordinated Unloaded Event (simultaneous temperature spike and door open event)[potentially] IN an Unloading or DESTINATION geo fence.
7. Geo fence OUT while loaded & pre-cooled to temperature
8. Geo fence IN while loaded & pre-cooled
9. In DESTINATION Geo fence with Coordinated Unloading Event
10. Reefer OFF Event IN DESTINATION Geo Fence
11. Reefer off and IN ORIGIN Geo Fence Event FIG. 5 shows the control temperatures of a transport refrigeration unit over approximately a two week period for a single trailer. The temperature set point is set to −20 degrees F., and as a matter of explanation, this is the temperature to which a microprocessor controlled refrigeration unit would try to hold the produce temperature. The control temperatures, identified as Discharge (or sometimes referred to as "Supply" temperature), and the "return" temperatures are actual temperature probe monitoring temperatures of re-circulating air in a trailer. Discharge/Supply is the temperature exiting the evaporator (and in general is colder than return when the refrigeration unit is trying to cool to a lower temperature (see red line below)). Return Temperature is the temperature that would pass over the produce and is generally higher in a cooling condition than discharge temperature (see blue line below). The use of other temperatures and control temperatures within the transport refrigeration unit could be monitored as well, including the outside or "ambient" temperature. Furthermore, some transport refrigeration units are separated into multiple compartments, most probably three compartments, in a "multi-temp" configuration, and the control temperatures of each compartment could also be used for the analysis.

The Diagram also illustrates that the time periods between the use of the transport refrigeration unit for refrigerated transport operations is only a portion of the overall time of ownership of the unit. For instance, over the eight day 16 hour (208 hour) period above, the unit was actually off for about a total of 5 days 9 hours (129 hours), where the transport refrigeration unit either was returning to the distribution or loading center, was undergoing maintenance, was hauling non-refrigerated freight or was idle. The transport refrigeration unit performed two total trips from the time they were switched on and cooled, until they delivered produce. Although the wireless device constantly monitors the system, the transport refrigeration control temperatures are generally only available when the refrigeration system is on, due to power conservation considerations. Independent remote temperature probes would provide temperature readings for the entire duration, however, these are not associated with the operation of the refrigeration equipment and without access to the reefer on events, set point temperature and actual control temperature settings, independent probes on a stand alone basis lose "context" to the operational considerations of the freight cycle.

FIG. 5 also shows that a cooling operation occurs at the beginning of each trip, drawing the unit temperature down to a range close to the set point. Also, several subsequent "spikes" of temperature are visible, which largely occur when the doors are opened for extended periods of time, exposing the monitored temperature sensors to warm ambient air.

Figure 6:
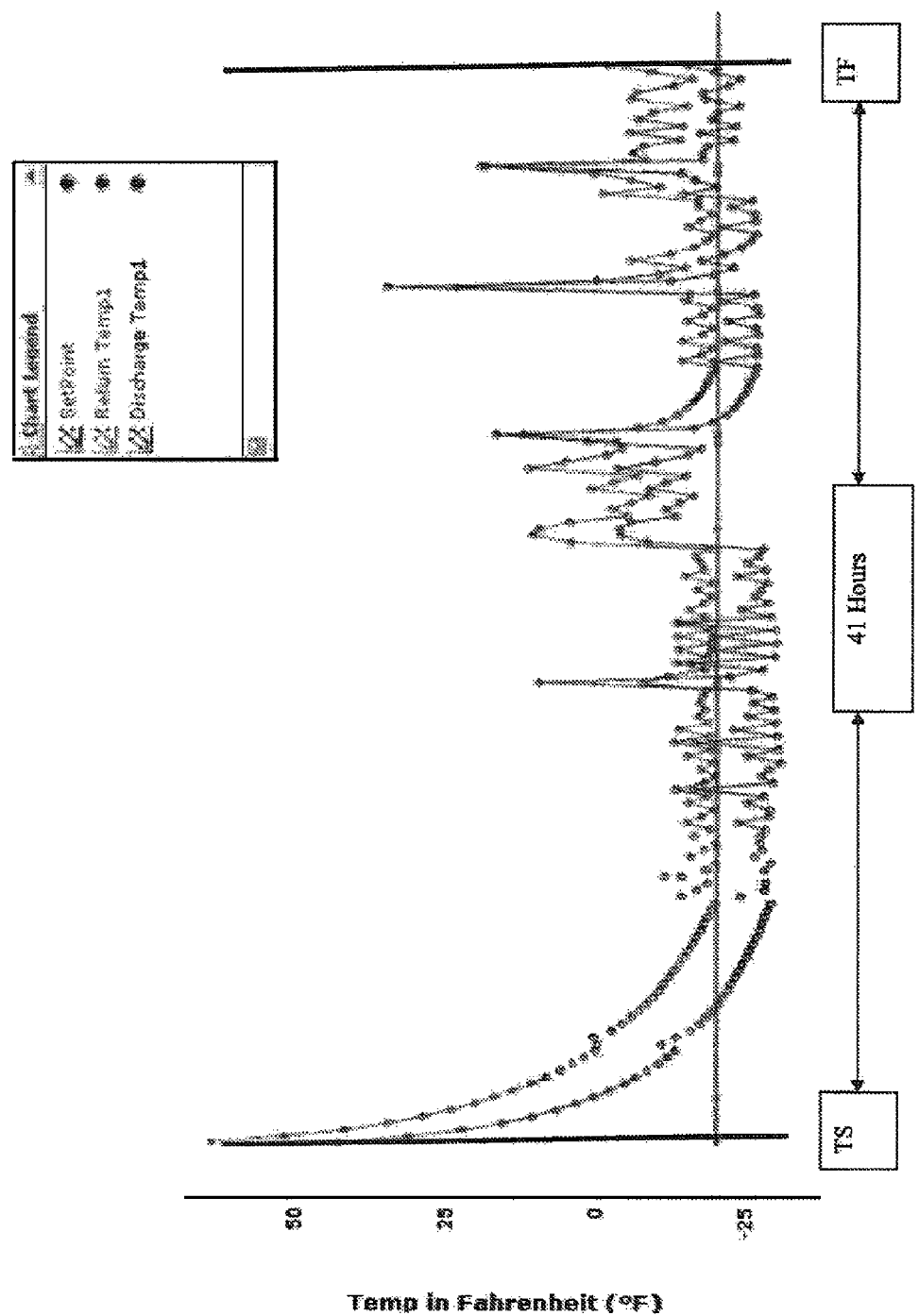
FIG. 6 shows one of the freight events in FIG. 5 in more detail.

The diagram in FIG. 6 is a closer examination of one of the two above freight events where individual temperature measurements are visible and recorded every 15 minutes. At the earliest time frame (TS), transport refrigeration unit is switched on, and the return temperature is read at 65 degrees F. At completion of the delivery of the produce, the latest time has the return temperature at approximately −5 degrees F. when the transport refrigeration unit is switched off (TF). The overall cycle of the shipment, from the time the refrigeration unit is turned on at TS until the trip is completed and the refrigeration unit is turned off is 41 hours.

Because the freight operation, from turning a refrigeration unit on until the produce is delivered and/or the refrigeration unit is switched off, involves various specific, significant events, it is feasible to allow the wireless device automatically monitor these freight events. Since these events are significant in the life cycle of the shipment, and unique to refrigeration transport, it is feasible to utilize the events to create specific "transport refrigeration states", which indicates the various operational states that a transport refrigeration unit might undergo during a shipment of temperature controlled produce. This invention, therefore, is focused on the unique and specific identification and monitoring processes for the specific significant events, as well as the logical creation and monitoring of the operational states of a transport refrigeration unit.

Figure 7:
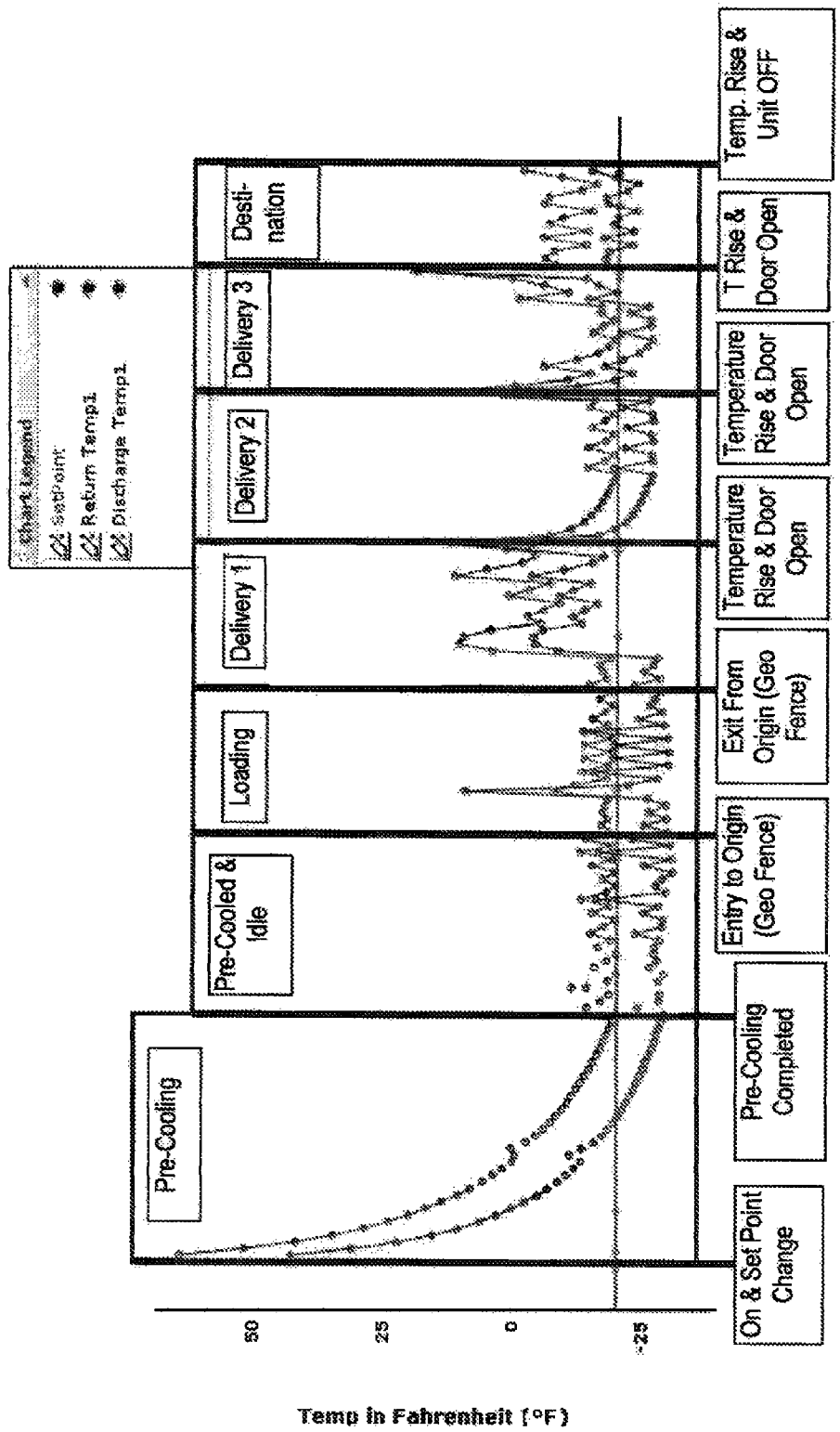
FIG. 7 identifies the significant events and transport refrigeration states.

In FIG. 7, the significant events and transport refrigeration states are identified below according to the same temperature profile of the shipment. As shown the events initiate each reefer state, as the wireless device, via independent monitoring, determines that the events have occurred:

Each event is determined automatically by the real-time monitoring of the wireless device, which reads refrigeration actions and temperatures, monitors historical information and compares it to the current information and measures the gps location of the transport refrigeration unit with respect to geo fence locations, oriented to the operator's origin and destination(s) configuration. This particular example is applied to a warehousing operation of cold storage produce delivered to several regional locations, such as retail or grocery stores.

Events in the above example include:
1. Transport Refrigeration ON Event/Set Point Change Event/Set Operating Characteristics
2. Pre-cooling Satisfied Event
    a. Pre-cooling Satisfied Event Automatic Notification
3. IN Loading or ORIGIN Geo Fence Event
4. Coordinated Loading Event (simultaneous temperature spike and door open event) IN an ORIGIN geo fence
5. OUT of a ORIGIN Geo Fence (when the system is loaded and pre-cooled to temperature)
6. Coordinated Unloaded Event (simultaneous temperature spike and door open event)[potentially] IN an Unloading or DESTINATION geo fence.
7. Geo fence OUT while loaded & pre-cooled to temperature
8. Geo fence IN while loaded & pre-cooled
9. In DESTINATION Geo fence with Coordinated Unloading Event
10. Reefer OFF Event IN DESTINATION Geo Fence
11. Reefer off and IN ORIGIN Geo Fence Event These are all discussed in the context of FIG. 7. When a refrigeration unit is switched on and its temperature set point is changed (in this example to −20 degrees F.), a wireless monitoring device may detect that the control temperatures are relatively far away from the set point. It would also detect that the rate of change of the control temperatures (discharge and return, in the instance below) was relatively large. From this detection logic, which involves the local comparison of current temperatures to historically stored temperatures, it is feasible to determine that the transport refrigeration unit is in a state of "pre-cooling". The significant events, in this example was an "local switch on" event, a "temperature set point change" event and a comparison of the control temperatures or ambient temperature to the set point and their rate of change, it is feasible to automatically declare that the transport refrigeration unit is in a "pre-cooling" state.

Definition and accurate monitoring of a "pre-cooling state" is important, because many types of produce should not be loaded prior to a transport refrigeration unit is properly pre-cooled to preserve its quality. On the other hand, excessive cooling means that equipment is not being utilized fully, fuel is being wasted and carbon emissions are being needlessly created. For this reason, the automatic generation of a "pre-cooling completed" event is necessary.

Figure 8:
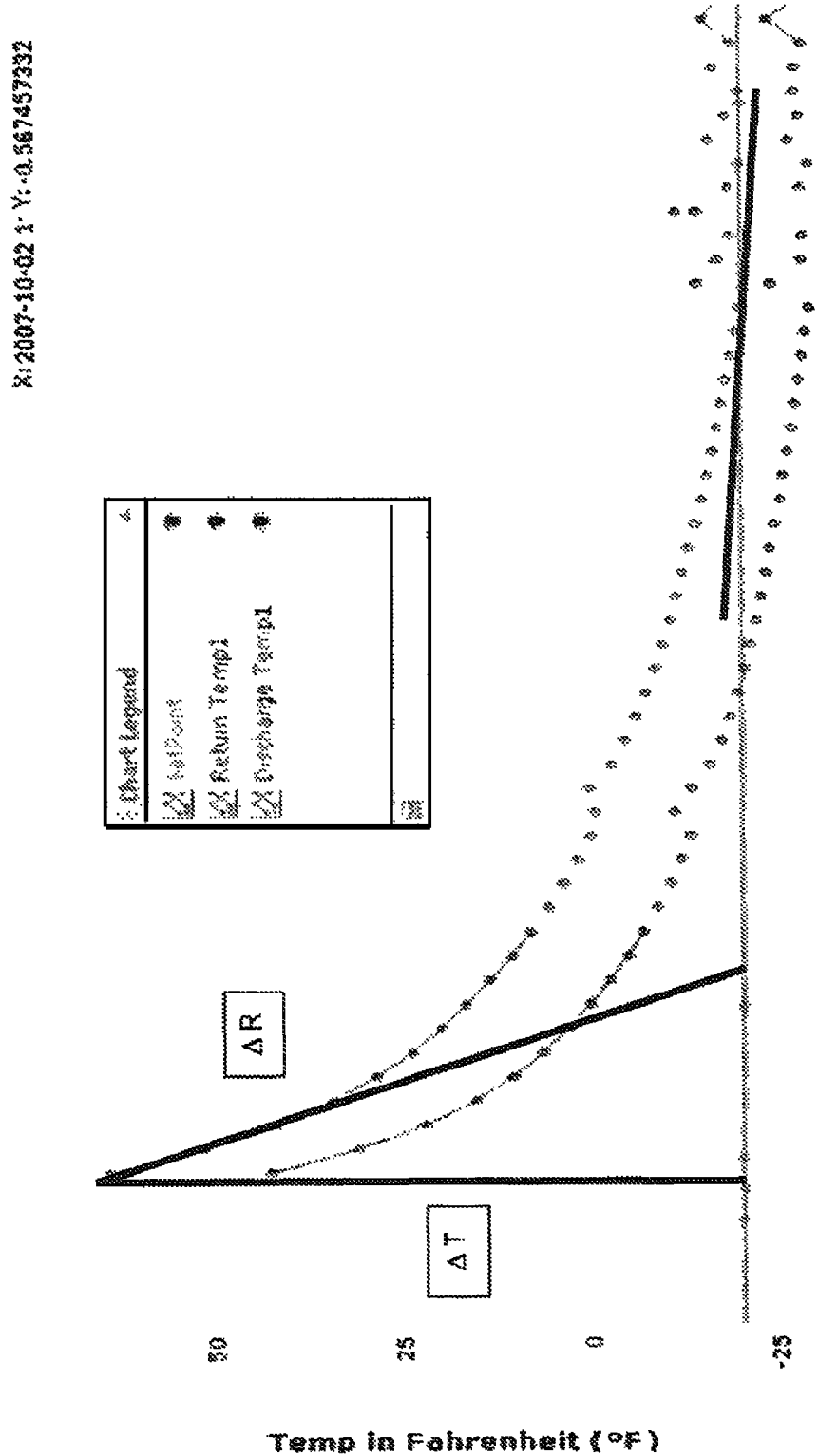
FIG. 8 shows creation of a pre-cooling event when the slope of the incremental temperature measurements approaches zero and the change in actual temperature from the set point also approaches zero.

As shown in FIG. 8, a pre-cooling event is created when the slope of the incremental temperature measurements ($\Delta$ R for return temperature) approaches zero and the change in actual temperature from the set point ($\Delta$ T) also approaches zero. The monitoring device is able to measure current temperatures with previously recorded temperatures to determine that pre-cooling is appropriate. Further, $\Delta$ T is a consideration for determining that pre-cooling is sufficient. This invention utilizes both concepts in concert to allow for units with high ambient temperature, which have difficulty mechanically getting to the set point temperature, to create a "conditional pre-cooling event" in that the slope of $\Delta$ R is approaching zero and $\Delta$ R is within an appropriate temperature range. For instance, in the example below, the operator may determine that the $\Delta$ T in this case might be appropriate at 10 degrees F. (it is appropriate to create a pre-cooling event at −10 F), which would save approximately 2 hours on the loading cycle without damaging the specific commodity in question.

The invention can utilize this concept for discharge/supply temperature, and any remote probes, as well as temperature readings for multiple compartments. Once a pre-cooling event is identified, a wireless event message is created and sent to a database. This allows pre-cooling event notifications to be sent to operational personnel to identify that this particular transport refrigeration unit is available for loading.

The creation of the "Transport Refrigeration Unit Pre-Cooling State" is necessary for the operator to identify how many units are in a pre-cooling state in real-time. The state is also necessary to distinguish between the next state, which is an "IDLE STATE" after a pre-cooling event is created.

An IDLE STATE exists when a Transport Refrigeration Unit is properly pre-cooled, but has not been loaded or staged to be loaded. Operators wish to minimize this Idle state, because it is wasteful in terms of equipment utilization, equipment wear and tear, fuel consumption, and pollution generation. Idle states exist for as long as a unit does not receive an intervening event, which allows the operator to gauge his efficiency. An intervening event might be that; (1) the trailer is hooked to a tractor or yard mover (2) exits a staging area, (3) enters a loading area, (4) experiences a door open event, (5) experiences a refueling event, or (6) any combination of the above. The significance and uniqueness of this event(s) is that they occur for a unit that had formerly experienced a pre-cooling event or was in a pre-cooling state, and that the transport refrigeration unit had not been turned off or had exited a yard in a non-authorized manner. Because the unit had experienced a pre-cooling event, it is now feasible to measure systematically the time frame of the IDLE State, in such a manner that the operator may systematically reduce the overall Idle time of their fleet.

In the example above, the Pre-Cooled, but IDLE State is completed upon the determination by the monitoring device that the unit has entered a geo fence area, which is designated as a loading area. In this manner, an operator may identify certain distribution centers and warehouses as an ORIGIN geo fence location, and therefore, the wireless device detects that the unit has entered a loading area. Thus the LOADING State has occurred. Intervening events are used to confirm the LOADING State or transition the LOADING State to a Delivery State. These intervening events might include any event or combination of event, such as (1) temperature increase, (2) door open, (3) entry into a loading area geo fence, (4) activation of a lift gate, etc. As the diagram shows, a temperature increase in both return and discharge temperature is used to make an automatic detection that the doors are open, exposing the sensors to warm ambient air. A temperature rise event is determined by the comparison of previous temperatures to the current temperature, with the current temperature being above a threshold temperature or above a $\Delta$ T for a specified period of time. The LOADING STATE, and the subsequent identification of these events are unique because they were pre-ceded by a successful pre-cooling event, and/or an Idle state and/or a geo fence entry when the refrigeration unit is on or all of the above.

An additional event would terminate the LOADING STATE. These would include; (1) a return of the temperature to an appropriate $\Delta$ T range, as detected with repeated readings, (2) an exit an ORIGIN designated Geofence. Again, automatic confirmation of this event is feasible with more certainty once it is preceded by any of the following; a reefer on event, a pre-cooling event, an Origin event, an Origin event when the reefer is on, a door open event, a temperature rise event, an exist of Loading Area event, etc.

Once the unit leaves the LOADING STATE by identification of an intervening event, it enters a DELIVERY STATE. A DELIVERY STATE is the time a refrigerated transport unit has left a distribution center and is headed for its first delivery location. If a unit makes multiple stops for deliveries, then the monitoring device will create multiple DELIVERY STATES. An event, which terminates the first Delivery State, would be any one or combination of the following; (1) a temperature rise event, (2) a door open event, (3) an entry into a "DESTINATION" Geo fence location, (4) exit from a Destination geo fence location, after a temperature event, a door open event, or a reefer off event, (5) a reefer off event. Any of these events could establish the beginning of the next DELIVERY STATE. This process continues until the FINAL DELIVERY STATE is initiated and terminated. This might be initiated by "ENTRY into a FINAL DESTINATION Geo fence or a Reefer On event with a subsequent acceptable Δ T measurement. Creation and termination of the FINAL DESTINATION STATE would be created by a Reefer Off event or a Reefer OFF event accompanied by leaving a Final Destination geofence. A NOT IN USE STATE is created when the transport refrigerated unit's local switch is not on.

Logging the results of the refrigerated transport cycle above, might yield the following results in terms of operational dwell time for each state of the shipment:

| OPERATIONAL STATE | TIME (HOURS) |
| --- | --- |
| Pre-cooling | 9 |
| Pre-cooled but Idle | 8 |
| Loading | 6 |
| Destination 1 | 5 |
| Destination 2 | 5 |
| Destination 3 | 4 |
| Delivery | 3 |
| Subtotal Operational States | 40 |
| Not In Use | 129 |
| Total Cycle | 169 |

In this freight example, inefficient time is spent in the IDLE and LOADING time when the transport refrigeration unit is ON. Of the 40 hours total time, this represents approximately 35% of the delivery life cycle of the shipment. By measuring the states, operators may focus on areas which reduce the dwell time in these areas, leading to better equipment utilization, better fuel consumption, less equipment wear and tear, and lower emissions, without sacrificing quality of the shipment. This type of analysis can be utilized universally for each transport refrigeration unit for each shipment in the entire fleet, leading to overall more efficient operation.

The process has the advantage in requiring no particular order. It is continuous and ad hoc.

While embodiments of the invention have been described in detail, it will be evident to those skilled in the art that the invention may be embodied otherwise without departing from its spirit and scope.

What is claimed is:

1. A method comprising:
sensing the temperature of a load in a transport refrigeration unit for a time period;
wirelessly transmitting information of the sensed temperature to a network;
in said network, determining changes in the sensed temperature during the time period;
determining a status of at least one of the load and the transport refrigeration unit based at least partially on a plurality of data points of the sensed temperature and the changes in the sensed temperature; and
automatically generating and storing time stamps associated with refrigerated operations and refrigerated operational events pertaining to the transport refrigeration unit, which are associated with changes in responsibility of refrigerated freight shipments, to permit responsible parties' measurement of operations, including fuel usage and dwell times.

2. A method comprising:
sensing the temperature of a load in a transport refrigeration unit for a time period;
wirelessly transmitting information of the sensed temperature to a network;
in said network, determining changes in the sensed temperature during the time period;
determining a status of at least one of the load and the transport refrigeration unit based at least partially on a plurality of data points of the sensed temperature and the changes in the sensed temperature; and
automatically compiling assessorial charges associated with refrigerated transport operations by utilizing wireless communications.

3. A method comprising:
sensing the temperature of a load in a transport refrigeration unit for a time period;
wirelessly transmitting information of the sensed temperature to a network;
in said network, determining changes in the sensed temperature during the time period;
determining a status of at least one of the load and the transport refrigeration unit based at least partially on a plurality of data points of the sensed temperature and the changes in the sensed temperature; and
automatically measuring refrigerated transport fuel levels via wireless transmissions compiled for third party re-imbursement of costs.

4. A method comprising:
sensing the temperature of a load in a transport refrigeration unit for a time period;
wirelessly transmitting information of the sensed temperature to a network;
in said network, determining changes in the sensed temperature during the time period;
determining a status of at least one of the load and the transport refrigeration unit based at least partially on a plurality of data points of the sensed temperature and the changes in the sensed temperature; and
continuously measuring time stamps, entry/exit into out of specific locations, and refrigerated operational conditions to automatically calculate equipment use fees of refrigerated transportation assets, so that fuel usage, equipment dwell time and equipment use maintenance costs may be calculated based on time in use and fuel used to allow the owner of the asset or party responsible for the shipment to invoice fees associated with actual, excessive or unauthorized use of the asset/fuel.

5. A method comprising:
sensing the temperature of a load in a transport refrigeration unit for a time period;
wirelessly transmitting information of the sensed temperature to a network;
in said network, determining changes in the sensed temperature during the time period;
determining a status of at least one of the load and the transport refrigeration unit based at least partially on a plurality of data points of the sensed temperature and the changes in the sensed temperature; and
continuously measuring time stamps, entry/exit into specific locations, and refrigerated operational conditions to automatically measure wasteful emissions.

6. A method comprising:
sensing the temperature of a load in a transport refrigeration unit for a time period;
wirelessly transmitting information of the sensed temperature to a network;
in said network, determining changes in the sensed temperature during the time period;
determining a status of at least one of the load and the transport refrigeration unit based at least partially on a plurality of data points of the sensed temperature and the changes in the sensed temperature; and
delivering wireless events of a refrigerated freight shipment based on "boundary" events, which are determined by the simultaneous examination of multiple freight conditions and refrigeration "states".

7. A method comprising:
sensing the temperature of a load in a transport refrigeration unit for a time period;
wirelessly transmitting information of the sensed temperature to a network;
in said network, determining changes in the sensed temperature during the time period;
determining a status of at least one of the load and the transport refrigeration unit based at least partially on a plurality of data points of the sensed temperature and the changes in the sensed temperature; and
breaking down a refrigerated shipment cycle into "segments", based on wireless events.

8. A method comprising:
sensing the temperature of a load in a transport refrigeration unit for a time period;
wirelessly transmitting information of the sensed temperature to a network;
in said network, determining changes in the sensed temperature during the time period;
determining a status of at least one of the load and the transport refrigeration unit based at least partially on a plurality of data points of the sensed temperature and the changes in the sensed temperature; and
summarizing and compiling transport cycle segment measurements to allow the creation of operational "standards" associated with each segment, so that continuous measurable improvement and statistical analysis may be performed.

9. A method comprising:
sensing the temperature of a load in a transport refrigeration unit for a time period;
wirelessly transmitting information of the sensed temperature to a network;
in said network, determining changes in the sensed temperature during the time period;
determining a status of at least one of the load and the transport refrigeration unit based at least partially on a plurality of data points of the sensed temperature and the changes in the sensed temperature; and
for refrigerated transport operations, logically distinguishing between geofences based on their operational nature, for automatically treating wireless communications appropriately for that facility.

10. A method comprising:
sensing the temperature of a load in a transport refrigeration unit for a time period;
wirelessly transmitting information of the sensed temperature to a network;
in said network, determining changes in the sensed temperature during the time period;
determining a status of at least one of the load and the transport refrigeration unit based at least partially on a plurality of data points of the sensed temperature and the changes in the sensed temperature; and
creating a pre-cooling notification complete wireless message, by comparing current temperatures to previous temperatures, and utilizing the time stamp of the notification to reduce cycle time and dwell time.

11. A method comprising:
sensing the temperature of a load in a transport refrigeration unit for a time period;
wirelessly transmitting information of the sensed temperature to a network;
in said network, determining changes in the sensed temperature during the time period;
determining a status of at least one of the load and the transport refrigeration unit based at least partially on a plurality of data points of the sensed temperature and the changes in the sensed temperature; and
associating refrigerated shipment trips with wireless refrigerated event notifications, geofence origin points, destination points, and in-route points to allow automatic compilation of shipment segments measurements for fuel, temperatures, and dwell time.

12. A method comprising:
sensing the temperature of a load in a transport refrigeration unit for a time period;
wirelessly transmitting information of the sensed temperature to a network;
in said network, determining changes in the sensed temperature during the time period;
determining a status of at least one of the load and the transport refrigeration unit based at least partially on a plurality of data points of the sensed temperature and the changes in the sensed temperature; and
portraying a refrigerated shipment cycle via a graphical display, which overlays fuel, refrigerated events, and temperatures for visual and statistical shipment performance monitoring.

13. A method comprising:
sensing the temperature of a load in a transport refrigeration unit for a time period;
wirelessly transmitting information of the sensed temperature to a network;
in said network, determining changes in the sensed temperature during the time period;
determining a status of at least one of the load and the transport refrigeration unit based at least partially on a plurality of data points of the sensed temperature and the changes in the sensed temperature; and
automatically and wirelessly measuring and creating a notification when transport refrigeration units are loaded with commodities that have not been pre-cooled.

14. A method comprising:
sensing the temperature of a load in a transport refrigeration unit for a time period;
wirelessly transmitting information of the sensed temperature to a network;
in said network, determining changes in the sensed temperature during the time period;
determining a status of at least one of the load and the transport refrigeration unit based at least partially on a plurality of data points of the sensed temperature and the changes in the sensed temperature; and
automatically logically associating a wireless notification for a destination geofence with a refrigeration unit turned off to mean the logical termination of a refrigerated shipment, and concurrently, logically associating a wireless notification for an origin geofence with a refrigeration unit turned on to mean the logical initiation of a refrigerated shipment.

15. A method comprising:
sensing the temperature of a load in a transport refrigeration unit for a time period;
wirelessly transmitting information of the sensed temperature to a network;
in said network, determining changes in the sensed temperature during the time period;
determining a status of at least one of the load and the transport refrigeration unit based at least partially on a plurality of data points of the sensed temperature and the changes in the sensed temperature; and
automatically utilizing shipment temperature profiles, created by wireless communications, associated with specific freight shipments, to resolve freight disputes at the time of delivery.

16. A method comprising:
sensing the temperature of a load in a transport refrigeration unit for a time period;
wirelessly transmitting information of the sensed temperature to a network;
in said network, determining changes in the sensed temperature during the time period;
determining a status of at least one of the load and the transport refrigeration unit based at least partially on a plurality of data points of the sensed temperature and the changes in the sensed temperature; and
measuring dwell times of specific refrigerated freight operations, which are determined exclusively by wireless communications delivering specific events associated with the boundary conditions of those events.

* * * * *